US012597987B2

(12) United States Patent
Hatamian et al.

(10) Patent No.: US 12,597,987 B2
(45) Date of Patent: Apr. 7, 2026

(54) REPEATER SYSTEM AND METHOD FOR OPERATING THE REPEATER SYSTEM FOR HIGH-PERFORMANCE WIRELESS COMMUNICATION

(71) Applicant: Peltbeam Inc., Sherman Oaks, CA (US)

(72) Inventors: Mehdi Hatamian, Mission Viejo, CA (US); Puya Rofougaran, Irvine, CA (US); Arman Rofougaran, Newport Beach, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 428 days.

(21) Appl. No.: 18/314,735

(22) Filed: May 9, 2023

(65) Prior Publication Data

US 2023/0361855 A1     Nov. 9, 2023

Related U.S. Application Data

(60) Provisional application No. 63/364,411, filed on May 9, 2022.

(51) Int. Cl.
H04B 7/155 (2006.01)
(52) U.S. Cl.
CPC .............................. H04B 7/15507 (2013.01)

(58) Field of Classification Search
CPC ........................ H04B 7/15507; H04B 7/15528
See application file for complete search history.

(56) References Cited

U.S. PATENT DOCUMENTS

| | | | | |
|---|---|---|---|---|
| 7,480,486 | B1 * | 1/2009 | Oh ...................... | H04B 7/1555 |
| | | | | 455/13.1 |
| 2020/0403689 | A1 * | 12/2020 | Rofougaran ........ | H04W 52/367 |
| 2021/0126701 | A1 * | 4/2021 | Patel ................... | H04B 7/15535 |

* cited by examiner

*Primary Examiner* — Ayodeji O Ayotunde
(74) *Attorney, Agent, or Firm* — CHIP LAW GROUP

(57) ABSTRACT

A repeater system that includes a first repeater device that includes a plurality of donor antennas, a radio modem, and a controller that sets up a plurality of different configurations of the plurality of donor antennas. The controller acquires a feedback from the radio modem for each of the plurality of different configurations and identifies a first configuration of donor antennas that manifests a highest signal-to-noise ratio (SNR) from amongst the plurality of different configurations. The controller then sets the identified first configuration of donor antennas at the first repeater device to capture radio frequency (RF) signals from a first radio access network (RAN) node in a first frequency band at a first beam pattern. A plurality of service antennas relays the RF signals captured via the first configuration of donor antennas in a second frequency band at a second beam pattern to UEs.

19 Claims, 8 Drawing Sheets

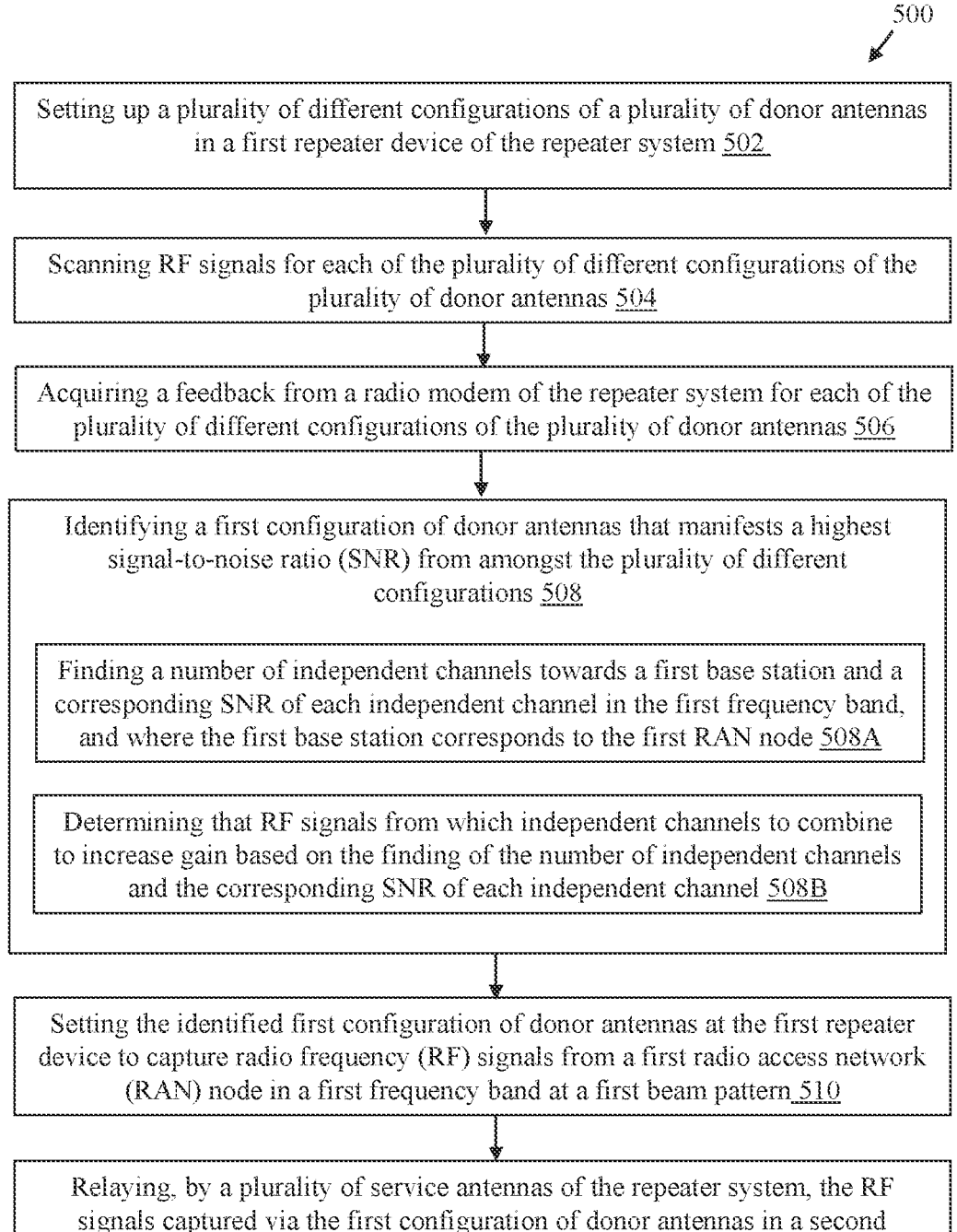

500

Setting up a plurality of different configurations of a plurality of donor antennas in a first repeater device of the repeater system 502

Scanning RF signals for each of the plurality of different configurations of the plurality of donor antennas 504

Acquiring a feedback from a radio modem of the repeater system for each of the plurality of different configurations of the plurality of donor antennas 506

Identifying a first configuration of donor antennas that manifests a highest signal-to-noise ratio (SNR) from amongst the plurality of different configurations 508

Finding a number of independent channels towards a first base station and a corresponding SNR of each independent channel in the first frequency band, and where the first base station corresponds to the first RAN node 508A Determining that RF signals from which independent channels to combine to increase gain based on the finding of the number of independent channels and the corresponding SNR of each independent channel 508B Setting the identified first configuration of donor antennas at the first repeater device to capture radio frequency (RF) signals from a first radio access network (RAN) node in a first frequency band at a first beam pattern 510

Relaying, by a plurality of service antennas of the repeater system, the RF signals captured via the first configuration of donor antennas in a second frequency band at a second beam pattern to one or more UEs 512

FIG. 5

REPEATER SYSTEM AND METHOD FOR OPERATING THE REPEATER SYSTEM FOR HIGH-PERFORMANCE WIRELESS COMMUNICATION

CROSS-REFERENCE TO RELATED APPLICATIONS/INCORPORATION BY REFERENCE

This Application makes reference to, claims priority to, and claims benefit from U.S. Provisional Application Ser. No. 63/364,411 filed on May 9, 2022. The above-referenced Application is hereby incorporated herein by reference in its entirety.

FIELD OF TECHNOLOGY

Certain embodiments of the disclosure relate to telecommunication systems. More specifically, certain embodiments of the disclosure relate to a repeater system and a method for operating the repeater system for high-performance wireless communication.

BACKGROUND

Typically, users near the edge of the cell in cellular networks often suffer from low signal-to-interference-plus-noise ratio (SINR) levels due to being far away from the base station. The cell-edge problem in cellular networks refers to the issue of poor signal quality and low data rates experienced by users located at the edge of the cell. This problem arises due to weak signal strength caused by distance-dependent path loss and multipath fading. It may not always be a feasible solution to increase the base station transmit power as it can lead to increased inter-cell interference.

Generally, RF repeater system may be used to extend the range of a wireless signal by receiving, amplifying, and retransmitting it to the intended receiver. In any mobile network, devices must maintain an adequate link budget on both the Downlink (DL) and Uplink (UL) for both control signaling and user data. However, conventional RF repeater systems face certain challenges with regards to link budget due to window and building penetration losses. One of the key challenges with conventional RF repeater systems is that the amplification process can amplify not only the desired signal, but also any unwanted noise or interference that may be present in the environment. This may result in a reduction in the signal-to-noise ratio, which can impact the overall link budget. Typically, when a radio signal passes through a window or a building, it can experience attenuation due to absorption, reflection, and scattering. Moreover, when the conventional repeater system is placed inside a building, it can experience additional losses due to absorption, reflection, and scattering. This can reduce the signal strength, leading to a reduction in the overall link budget. This requires careful attention to the design and deployment of the repeater system. Thus, there are many open technical challenges for successful and practical use of the repeater systems. In a first example, one of the most prominent technical issue is how to achieve cell center like performance even in the cell edge areas using a repeater system without increasing the telecommunications infrastructure cost. Currently, conventional repeater system's performance becomes significantly degraded as the distance from the cellular signal source (e.g., the base station or a small cell) increases, for example, at the cell edge areas. In a second example, Quality of experience (QoE) is another open issue, which is a measure of a user's holistic satisfaction level with a service provider (e.g., Internet access, video streaming, or other carrier network-enabled services). The challenge is how to ensure seamless connectivity as well as QoE without significantly increasing infrastructure cost, which may be commercially unsustainable with present solutions. In indoor scenarios, like a home or an enterprise, poor signal strength from a wireless network, for example, due to the window and building penetration losses, can make surfing the internet and downloading or uploading content a frustrating experience. Furthermore, the number of wireless sensors and IoT devices are rapidly increasing with the increase in smart homes, smart offices, enterprises, etc. Existing communication systems are unable to handle such massive number of wireless sensors and IoT devices and their quality-of-service (QoS) requirements. In such cases, it is extremely difficult and technically challenging to support these end user devices for high-speed low latency applications.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A repeater system and a method for operating the repeater system for high-performance wireless communication, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF DRAWINGS

FIG. 5 is a flowchart illustrating an exemplary method for operating a repeater system for high performance wireless communication, in accordance with an embodiment of the disclosure.

DETAILED DESCRIPTION OF THE DISCLOSURE

Certain embodiments of the disclosure may be found in a repeater system and a method for operating the repeater system for high-performance wireless communication. The repeater system overcomes scanning loss, signal attenuating or blocking obstacles, bring street side signal indoors, and significantly enhances QoE of the one or more user equipment (UEs) in indoor area connected to the repeater system. The repeater system intelligently calibrates itself based on feedback from a radio modem. The repeater system may be highly programmable, where a first repeater device of the repeater system may be capable of dynamically setting up a plurality of different configurations of a plurality of donor antennas in the first repeater device. The best configuration of donor antennas out of the plurality of different configurations may be identified, where the best configuration may be the one which manifests the highest signal-to-noise ratio (SNR) from amongst the plurality of different configurations, thereby providing significantly improved data throughput rate and SNR via relayed RF signals to the one or more UEs. In the following description, reference is made to the accompanying drawings, which form a part hereof, and in which are shown, by way of illustration, various embodiments of the present disclosure.

Figure 1:
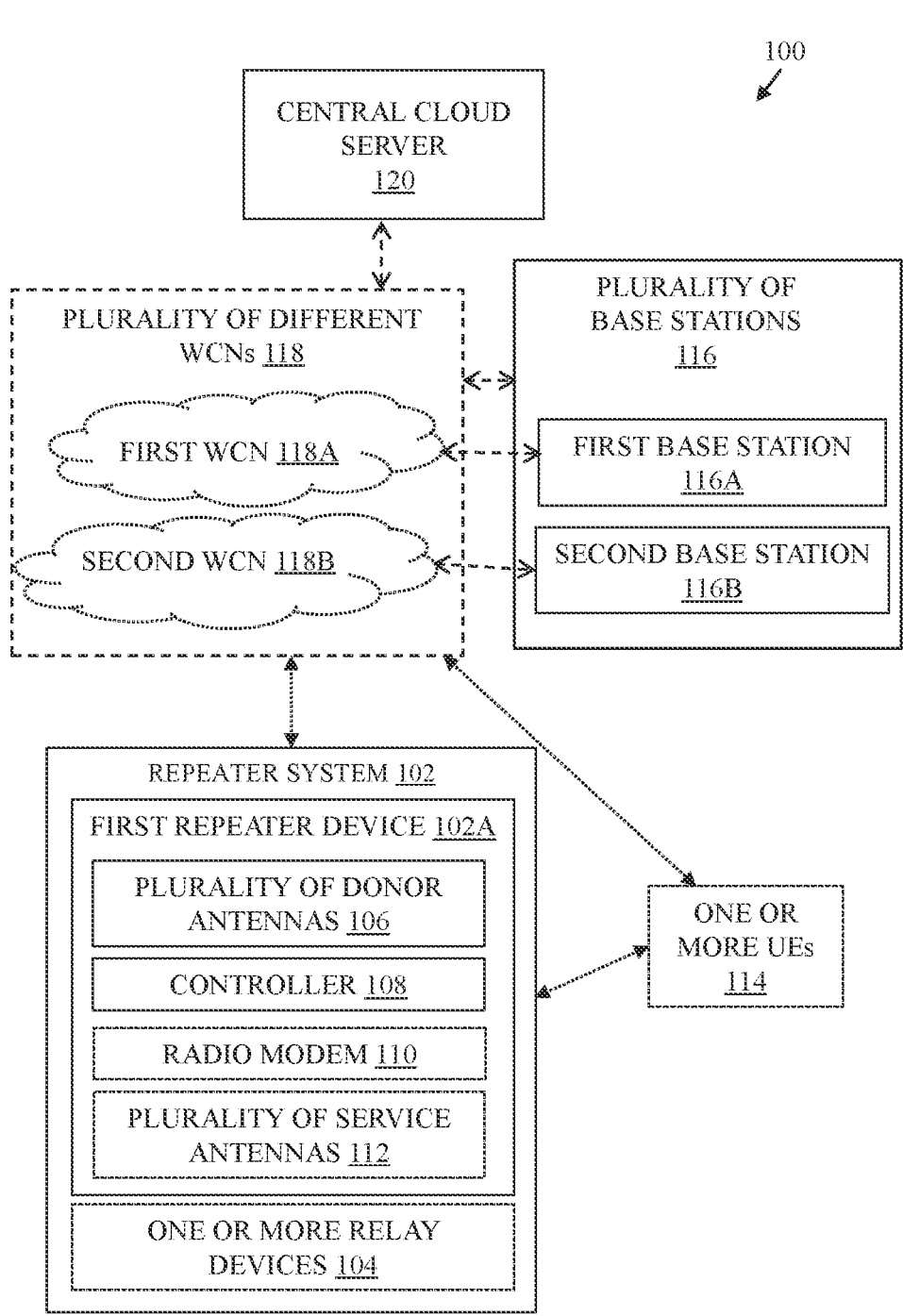
FIG. 1 is a diagram illustrating a network environment of an exemplary repeater system, in accordance with an exemplary embodiment of the disclosure.

FIG. 1 is a diagram illustrating a network environment of an exemplary repeater system, in accordance with an exemplary embodiment of the disclosure. With reference to FIG. 1, there is shown a network environment 100 of a repeater system 102. The repeater system 102 may include a one-box repeater (e.g., a first repeater device 102A) or a multi-box repeater, such as a two-box or a three-box repeater (e.g., the first repeater device 102A in addition to one or more relay devices 104). The first repeater device 102A may include a plurality of donor antennas 106 and a controller 108. In an implementation, a radio modem 110 and a plurality of service antennas 112 may be provided in the first repeater device 102A. In another implementation, the radio modem 110 may be provided in at least one of the one or more relay devices 104. In such a case, for example, one of the one or more relay devices 104 may be customer-premise equipment (CPE). In some implementations, when the repeater system 102 is implemented as the multi-box repeater and where the service side of the first repeater device 102A is coupled to the one or more relay devices 104 with a wired medium (e.g., a coaxial cable), the plurality of service antennas 112 may not be provided in the first repeater device 102A. In such a case, the plurality of service antennas 112 may be provided in each of the one or more relay devices 104. There is further shown one or more user equipment (UEs) 114, a plurality of base stations 116 (e.g., a first base station 116A and a second base station 116B), a plurality of different wireless carrier networks (WCNs) 118 (e.g., a first WCN 118A and a second WCN 118B), and a central cloud server 120. In an implementation, the repeater system 102 may be communicatively coupled to the central cloud server 120.

In an implementation, the repeater system 102 may be designed and developed to overcome the C-band link budget challenges due to window and building penetration losses. The repeater system 102 may include one or more repeater devices, such as the first repeater device 102A and the one or more relay devices 104. The first repeater device 102A may include suitable logic, circuitry, and interfaces that may be configured to communicate with a radio access network (RAN) node, such as the first base station 116A or a second base station 116B. The repeater system 102 enables data communication at a multi-gigabit data rate. In an implementation, the repeater system 102 may be a C-band indoor repeater system that may operate in C-band frequencies (e.g., 4-8 GHz or 3.7-4.2 GHz) for 5G NR communication. One or more C-Band indoor repeaters (e.g., the first repeater device 102A and/or the one or more relay devices 104) of the repeater system 102 may operate in conjunction with indoor C-Band fixed wireless access (FWA) modems to ensure sufficient link margins to achieve pre-defined customer data rates (i.e., data throughput rates). In an implementation, the one or more C-Band indoor repeaters (e.g., the first repeater device 102A and/or the one or more relay devices 104) of the repeater system 102 may be 5G NR indoor repeaters that may support all channel bandwidths up to, for example, 100 MHz. Further, the first repeater device 102A may support a plurality of components carriers, for example, four component carriers and a total aggregated bandwidth, for example, approximately of 200 MHz in an example. Furthermore, the one or more C-Band indoor repeaters (e.g., the first repeater device 102A and/or the one or more relay devices 104) of the repeater system 102 may support both downlink and uplink 4×4 MIMO on bands n77, which is a 5G NR frequency band commonly known as C-band 5G. In another implementation, the repeater system 102 may support multiple and a wide range of frequency spectrum, for example, 4G and 5G (including out-of-band frequencies).

In the one-box implementation of the repeater system 102, there may be one repeater device, such as the first repeater device 102A, in the repeater system 102. Examples of the first repeater device 102A may include but is not limited to, a C-band 5G NR repeater device, a C-band indoor repeater device, or a FR1 and FR2 capable indoor repeater device, a C-band donor, or other repeater device, such as an outdoor repeater device. An example of the one-box implementation of the first repeater device 102A is shown and described, for example, in FIGS. 2A and 2B. The first repeater device 102A may include the plurality of donor antennas 106, the controller 108, and the plurality of service antennas 112. Each of the plurality of donor antennas 106 and the plurality of service antennas 112 may be an antenna that may operate in one or more of: a C-band, FR1 band of 5G NR, FR2 band of 5G NR, LTE band, and the like. In an implementation, each of the plurality of donor antennas 106 and the plurality of service antennas 112 may be a patch antenna. In an implementation, each of the plurality of donor antennas 106 and the plurality of service antennas 112 may be a phase-array antenna, an individual antenna, or other types of C-band antenna. Examples of the controller 108 may include but are not limited to a digital signal processor (DSP), a central processing unit (CPU), a field programmable gate array (FPGA), a combination of CPU and FPGA, or other control circuitry.

In the multi-box implementation of the repeater system 102, there may be two or more repeater devices, such as the first repeater device 102A and the one or more relay device 104. Each of the one or more relay device 104 may be a service side relays that may be communicatively coupled to the donor, such as the first repeater device 102A at one end and service the one or more UEs 114 from another end. An example of the multi-box implementation of the first repeater device 102A is shown and described, for example, in FIGS. 2C and 2D.

Each of the one or more UEs 114 may correspond to a telecommunication hardware used by an end-user to communicate. Alternatively stated, the one or more UEs 114 may refer to a combination of a mobile equipment and subscriber identity module (SIM). Each of the one or more UEs 114 may be subscriber of at least one of the plurality of different WCNs 118. Examples of the one or more UEs 114 may include, but are not limited to a smartphone, a virtual reality headset, an augment reality device, a wireless modem, a customer-premises equipment (CPE), a home router, a cable or satellite television set-top box, a VoIP station, or any other customized hardware for telecommunication.

Each of the plurality of base stations 116 may be a fixed point of communication that may communicate information, in form of a plurality of beams of RF signals, to and from communication devices, such as the repeater system 102 and one or more UEs 114. Multiple base stations corresponding to one service provider, may be geographically positioned to cover specific geographical areas. Typically, bandwidth requirements serve as a guideline for a location of a base station based on relative distance between the UEs and the base station. The count of base stations depends on population density and geographic irregularities, such as buildings and mountain ranges, which may interfere with the plurality of beams of RF signals. In an implementation, each of the plurality of base stations 116 may be a gNB. In another implementation, the plurality of base stations 116 may include eNBs, Master eNBs (MeNBs) (for non-standalone mode), and gNBs.

Each of the plurality of different WCNs 118 may be owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 118 may own or control elements of a network infrastructure to provide services to its subscribers over the licensed spectrum, for example, 4G LTE, or 5G spectrum (FR1 or FR2). For example, the first base station 116A may be controlled, managed, or associated with the first WCN 118A, and the second base station 116B may be controlled, managed, or associated with the second WCN 118B different from the first WCN 118A. The plurality of different WCNs 118 may also include mobile virtual network operators (MVNO).

The central cloud server 120 includes suitable logic, circuitry, and interfaces that may be configured to communicate with the repeater system 102 and/or the plurality of base stations 116. In an example, the central cloud server 120 may be a remote management server that is managed by a third party different from the service providers associated with the plurality of different WCNs 118. In another example, the central cloud server 120 may be a remote management server or a data center that is managed by a third party, or jointly managed, or managed in coordination and association with one or more of the plurality of different WCNs 118. In an implementation, the central cloud server 120 may be a master cloud server or a master machine that is a part of a data center that controls an array of other cloud servers communicatively coupled to it, for load balancing, running customized applications, and efficient data management.

Typically, users near the edge of the cell in cellular networks often suffer from low signal-to-interference-plus-noise ratio (SINR) levels due to being far away from a base station. When a radio signal passes through a window or a building, it can experience attenuation due to absorption, reflection, and scattering. Moreover, when the conventional repeater system is placed inside a building, it can experience additional losses due to absorption, reflection, and scattering. This can reduce the signal strength, leading to a reduction in the overall link budget.

Beneficially, the repeater system 102 significantly improves the data throughput rate and SNR of the one or more UEs 114 connected to the repeater system 102. The repeater system 102 intelligently calibrates itself based on feedback from the radio modem 110. The repeater system 102 may be programmable where the controller 108 of the first repeater device 102A may be configured to set up a plurality of different configurations of the plurality of donor antennas 106. In other words, whether to select one, two, three, or more antennas or combine them in one or more configurations to identify the best configuration of donor antennas may be dynamically done based on the feedback from the radio modem 110. The best configuration of donor antennas may be the one which manifests the highest signal-to-noise ratio (SNR) from amongst the plurality of different configurations, thereby providing significantly improved data throughput rate and SNR via RF signals relayed by the one or more service antennas 112 to the one or more UEs 114. Thus, the repeater system 102 not only achieves cell center like performance even in the cell edge areas but also ensures a seamless connectivity as well as QoE without increasing the telecommunications infrastructure cost.

Figure 2A:
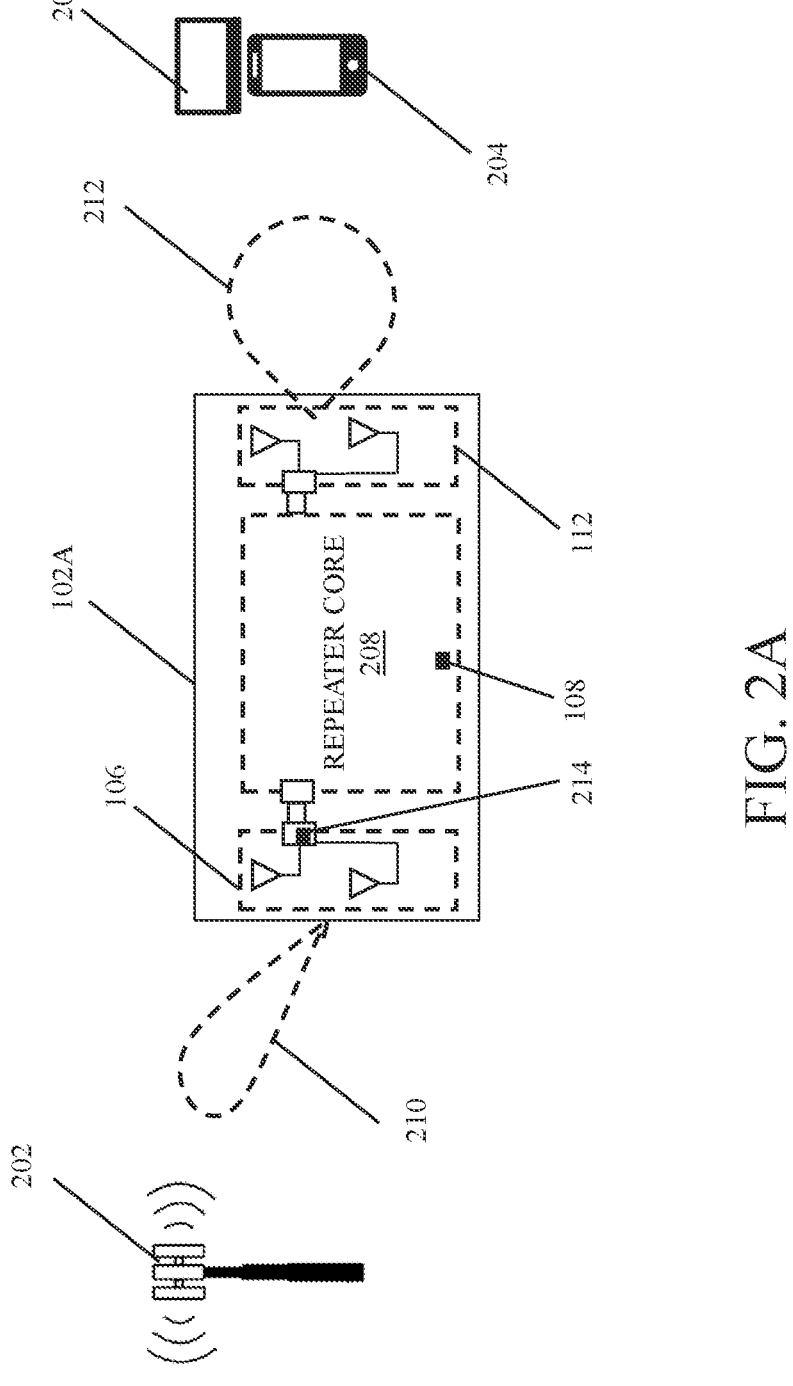
FIG. 2A is a diagram illustrating an exemplary repeater system with a first repeater device, in accordance with an exemplary embodiment of the disclosure.

FIG. 2A is a diagram illustrating an exemplary repeater system with a first repeater device, in accordance with an exemplary embodiment of the disclosure. FIG. 2A is explained in conjunction with elements from FIG. 1. With reference to FIG. 2A, there is shown the first repeater device 102A, a first radio access network (RAN) node 202, and one or more UEs, such as a first UE 204 (e.g., a smartphone) and a second UE 206 (e.g., a smart TV). The first repeater device 102A may include a repeater core 208. The first repeater device 102A may further include the plurality of donor antennas 106 that may handle a first beam of RF signals 210 and the plurality of service antennas 112 that may handle a second beam of RF signals 212.

In operation, the controller 108 of the first repeater device 102A may be configured to set up a plurality of different configurations of the plurality of donor antennas 106. The first repeater device 102A may be configured and designed to re-calibrate itself to achieve two objectives, for example, optimizing signal reception from the first RAN node 202 (e.g., a small cell or a gNB) and maximizing the signal-to-noise ratio (SNR) to finally serve the one or more UEs, such as the first UE 204 and the second UE 206. In order to optimize signal reception from the first RAN node 202 and maximize the SNR, the controller 108 may be configured to automatically re-calibrate and re-configure its donor antennas to determine which configuration meets the two objectives and maintains a strong and stable connection to the network, even in areas with poor signal coverage. Thus, firstly, the controller 108 sets up the plurality of different configurations of the plurality of donor antennas 106. Each configuration of the plurality of different configurations of the plurality of donor antennas 106 may comprise a unique antenna configuration. For example, in a case where there are four donor antennas, either two of the four donor antennas may be combined, i.e., electrically connected, so that same RF signals from two independent channels may be combined for increased signal power and diversity. Similarly, in one configuration, three donor antennas may be combined. In yet another configuration all four donor antennas may be combined. Alternatively, different donor antennas may not be combined and be independent of each other.

In accordance with an embodiment, the repeater system 102 (e.g., specifically, the first repeater device 102A) may further comprise a switching network 214, where in each of the plurality of different configurations of the plurality of donor antennas 106, a different number of donor antennas of the plurality of donor antennas 106 may be electrically connected via the switching network 214. The switching network comprises a matrix of switches that may arranged such that one donor antennas can be electrically coupled and decoupled based on instructions from the controller 108. When a particular donor antenna needs to be connected to another donor antenna, the controller 108 may send a signal to the switching network 214 to close the corresponding switch, which establishes an electrical connection between the particular donor antenna and the other donor antenna. Similarly, when one specific donor antenna needs to be disconnected from another donor antenna, the controller 108 may send a signal to open the corresponding switch, which breaks the electrical connection. By using the switching network 214 with a matrix of switches, the repeater system 102 can be dynamically reconfigured to adapt to changing environmental conditions or other factors that affect the quality of the signal. For example, if one donor antenna is experiencing interference or noise, the switching network 214 may be used to disconnect that donor antenna and connect a different one with better performance in real time or near real time.

In accordance with another embodiment, in each of the plurality of different configurations of the plurality of donor antennas 106, a different number of donor antennas of the plurality of donor antennas 106 may be electrically connected in a different shape pattern via the switching network 214. For example, if there are 6 donor antennas, they could be connected in different patterns such as a U-shaped pattern of four donor antennas, a C-shaped pattern of three or more donor antennas, an L-shaped pattern of three or more donor antennas, a 2×3 grid, a circular pattern, or a linear pattern, to determine which configuration provides best performance in terms of highest SNR and data throughput rate.

The controller 108 of the first repeater device 102A may be further configured to acquire feedback from the radio modem 110 for each of the plurality of different configurations of the plurality of donor antennas 106. In an implementation, the feedback from the radio modem 110 may comprise a signal quality state, a data throughput rate, and other signal parameters captured at a location of the first repeater device 102A for each of the plurality of different configurations of the plurality of donor antennas 106. The controller 108 may be configured to monitor the signal quality state (e.g., SNR), the data throughput rate, and other signal parameters (e.g., Received Signal Strength Indicator (RSSI), Reference Signal Received Power (RSRP)) based on signal measurements done for RF signal received from each of the plurality of different configurations of the plurality of donor antennas 106. In other words, in order to find the best combination, a systematic search may be performed over the different possible configurations and parameters, evaluating the performance in terms of both SNR and data throughput rate. The radio modem 110 employed for this purpose may be provided in at least one of: the first repeater device 102A, one of the one or more UEs, such as the first UE 204 or the second UE 206, or a customer premise equipment (CPE) communicatively coupled to the first repeater device 102A.

In accordance with an embodiment, the controller 108 may be further configured to scan RF signals for each of the plurality of different configurations of the plurality of donor antennas 106 and the feedback is acquired when a scanned and captured RF signal is passed to the radio modem 110. Alternatively, in some embodiments, the feedback may be received from the central cloud server 120 or another communication device, such as a customer premise equipment (CPE) that may be communicatively coupled to the first repeater device 102A.

The controller 108 of the first repeater device 102A may be further configured to identify a first configuration of donor antennas that manifests a highest signal-to-noise ratio (SNR) from amongst the plurality of different configurations. Based on the acquired feedback from the radio modem 110 for each of the plurality of different configurations of the plurality of donor antennas 106, the controller 108 knows the SNR values and data throughput rate achieved by each of the plurality of different configurations. Thus, the best configuration of donor antennas out of the plurality of different configurations may be identified and selected by the controller 108. The first configuration of donor antennas that manifests the highest signal-to-noise ratio (SNR) overcomes scanning loss, signal attenuating or blocking obstacles, bring street side signal indoors, and significantly enhances signal quality in indoor area.

In accordance with an embodiment, in order to identity the best configuration of donor antennas in terms of highest SNR and data throughout rate, the controller 108 may be further configured to find a number of independent channels towards the first base station 116A (e.g., the first RAN node 202) and a corresponding SNR of each independent channel in the first frequency band (e.g., a C-frequency band). Thereafter, the controller 108 may be further configured to determine that RF signals from which independent channels to combine to increase gain based on the finding of the number of independent channels and the corresponding SNR of each independent channel. The SNR of each channel can be calculated as the ratio of the received signal power to the noise power. Once the independent channels have been identified and the SNR of each channel has been calculated, the channels with the highest SNRs can be selected for combining.

The controller 108 of the first repeater device 102A may be further configured to set the identified first configuration of donor antennas at the first repeater device 102A to capture radio frequency (RF) signals from the first RAN node 202 in a first frequency band at a first beam pattern. By forming dynamic configurations of donor antennas of the plurality of donor antennas 106, identifying the best configuration, and then using the best configuration (i.e., the identified first configuration of donor antennas), the signal reception from the first RAN node 202 (e.g., a small cell or a gNB) and the SNR is significantly improved to service the one or more UEs, such as the first UE 204 and the second UE 206) with consistent performance. In an example, the first frequency band may be a C-band and the first beam pattern may be a narrow beam pattern or a pencil beam pattern.

The plurality of service antennas 112 may be further configured to relay the RF signals captured via the first configuration of donor antennas in a second frequency band at a second beam pattern to one or more UEs, such as the first UE 204 and the second UE 206. In an implementation, the RF signals captured by the first configuration of donor antennas may be passed to the plurality of service antennas 112 to further relay the RF signals to the one or more UEs, such as the first UE 204 and the second UE 206. As the captured RF signals manifest increased SNR and data throughout rate, the relayed RF signals thus improves the QoE of the one or more UEs, such as the first UE 204 and the second UE 206. Beneficially, the first repeater device 102A significantly improves the data throughput rate and SNR of the one or more UEs 114 connected to the first repeater device 102A. Thus, the first repeater device 102A of the repeater system 102 not only achieves cell center like performance even in the cell edge areas but also ensures a seamless connectivity as well as the QoE without increasing the telecommunications infrastructure cost.

In accordance with an embodiment, the first beam pattern (e.g., a narrow beam pattern or a pencil beam pattern) has a beam width that is less than the beam width of the second beam pattern (e.g., a broad beam pattern). In an implementation, the first frequency band (e.g., a C-band) may be same as the second frequency band (also C-band). In another implementation, the first frequency band (FR1 or FR2) may be different from the second frequency band (FR1 or FR2).

In accordance with an embodiment, the controller 108 may be further configured to switch from the first configuration of donor antennas to a second configuration of donor antennas when the SNR associated with the first configuration of donor antennas falls below a first threshold value but is above a second threshold value. When the SNR associated with the first configuration of donor antennas falls below the first threshold value, it indicates that the current SNR is at the borderline in terms of pre-defined data throughput rate (e.g., customer assured data rate) and a proactive change may be required to continue to maintain the SNR and the data throughout rate on or above the pre-defined data throughput rate (e.g., in multi-gigabits rate) before it reaches the second threshold value, which is not desired. The first threshold value may be higher than the second threshold value. Moreover, the second configuration of donor antennas may be different from the first configuration of donor antennas. For example, the second configuration of donor antennas may include a combination of N-X number of donor antennas (e.g., 3 donor antennas), whereas the first configuration of donor antennas may include a combination of N-Y number of donor antennas (e.g., 2 donor antennas), where N is a number of antennas and X is a natural number different from the Y.

In accordance with an embodiment, the controller 108 may be further configured to switch from the first configuration of donor antennas to a second configuration of donor antennas based on an instruction received from the central cloud server 120 communicatively coupled to the first repeater device 102A. The first repeater device 102A may be communicatively coupled to the central cloud server 120. The feedback from the radio modem 110 for each of the plurality of different configurations of the plurality of donor antennas 106 may be communicated to the central cloud server 120. In other words, the central cloud server 120 may periodically obtain the feedback from the repeater system 102 with regards to impact of setting each of the plurality of different configurations of donor antennas in terms of SNR and data throughput rate provided by the repeater system 102. Thus, the central cloud server 120 becomes well aware of the signal rank, RSRP, and SNR, and data throughput rate for each of the plurality of different configurations of donor antennas. Thus, due to the dynamic nature of the environment, when the central cloud server 120 predicts (or determines) that a signal attenuating event may occur (or has occurred) that may attenuate the signal received by the first repeater device 102A from the first RAN node, such as the first base station 116A, the central cloud server 120 may communicate the instruction to the first repeater device 102A to switch from the first configuration of donor antennas to the second configuration of donor antennas (i.e., a different configuration of donor antennas, which has the capability to capture even the attenuated or faint signal with increased receptivity unless otherwise missed by the first configuration of donor antennas).

In accordance with an embodiment, the controller 108 may be further configured to switch from the first configuration of donor antennas to the second configuration of donor antennas based on a given time-of-day to maintain a data throughput rate at the one or more UEs, such as the first UE 204 and the second UE 206, above a threshold data speed value. It is observed during experimentation that the fluctuations or changes in signal quality may occur at different times-of-day, which may be attributed to dynamic nature of the environment, e.g., any change in surroundings that has the potential to adversely impact signal propagation, cause signal loss, poor reach, or signal blockage by moving or stationary objects in surroundings. Further, a fluctuation (e.g., an increase or decrease) in the base station transmitting power at different times of day or a change in weather may further lead to fluctuations or changes in signal quality at different times of day. Thus, the first configuration of donor antennas may be updated to the second configuration of donor antennas or a new configuration of donor antennas depending on a current time of day to maintain consistent data throughput rate, i.e., above the threshold data speed value, which may be pre-defined (e.g., a customer assured minimum data rate).

In accordance with an embodiment, the controller 108 may be further configured to concurrently capture: (a) a first set of RF signals, by a first set of donor antennas of the plurality of donor antennas 106, from the first base station 116A associated with the first WCN 118A via a first set of channels, and (b) a second set of RF signals, by a second set of donor antennas of the plurality of donor antennas 106, from the second base station 116B associated with the second WCN 118B. Thus, the one or more UEs 114 may choose service of either the first WCN 118A or the second WCN 118B. In other words, in this embodiment, the repeater system 102 may handle multiple WCNs concurrently and share its resources with the first WCN 118A and the second WCN 118B.

Figure 2B:
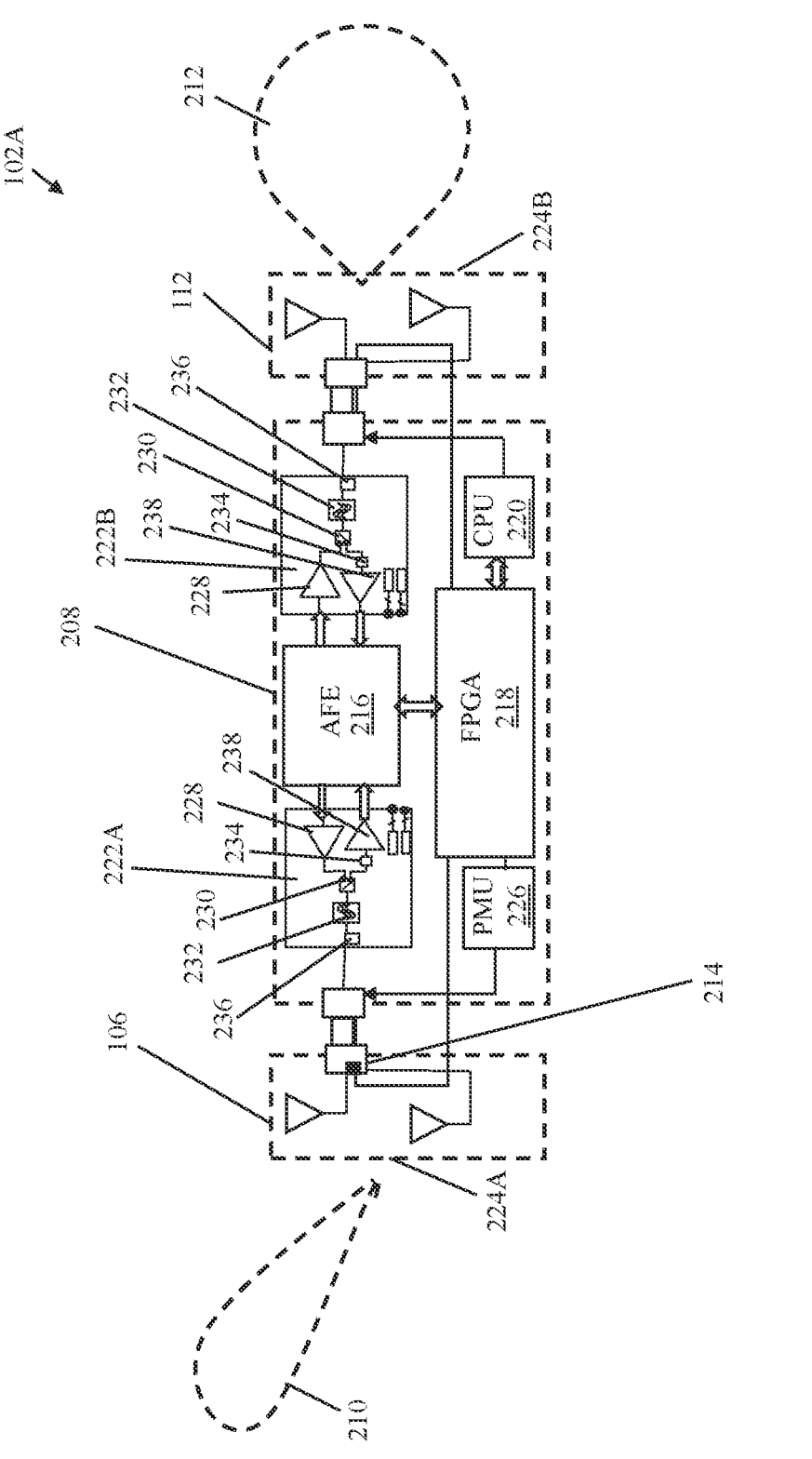
FIG. 2B is a diagram illustrating an exemplary first repeater device with a repeater core of the exemplary repeater system of FIG. 2A, in accordance with an exemplary embodiment of the disclosure.

FIG. 2B is a diagram illustrating an exemplary first repeater device with a repeater core of a repeater system of FIG. 2A, in accordance with an exemplary embodiment of the disclosure. FIG. 2B is explained in conjunction with elements from FIGS. 1 and 2A. With reference to FIG. 2B, there is shown the first repeater device 102A with the repeater core 208. The first repeater device 102A may further include the plurality of donor antennas 106 associated with the first beam of RF signals 210 and the plurality of service antennas 112 associated with the second beam of RF signals 212.

In an implementation, the repeater core 208 may include an analog front-end (AFE) 216, a field programmable gate array (FPGA) 218, and a central processing unit (CPU) 220. In this case, the repeater core 208 may include two integrated RF front end components, such as two power amplifier module integrated duplexer (PAMiDs) components 222A and 222B, each arranged at either side of the AFE 216 for donor side 224A and service side 224B operations of the first repeater device 102A. The repeater core 208 may further include a phasor measurement unit (PMU) component 226. Each PAMiD component 222A and 222B may comprise a power amplifier (PA) 228 connected to a transmit-receive switch (Tx-Rx SW) 230. The Tx-Rx SW 230 may be used to switch the PA 228 between transmit and receive modes. In each PAMiD component 222A and 222B, there is further shown a bandpass filter (BPF) 232 and a high-pass filter (HPF) 234 both connected to the Tx-Rx SW 230. The BPF 232 may be further connected to a coupling (CPL) Component 236. The HPF 234 may be coupled to a low noise amplifier (LNA) 238.

The AFE 216 may be an interface between the analogue RF signal and the digital processing components of the repeater core 208. The AFE 216 may receive the signal from the PAMiD component 222A or 222B, may filter and digitize it, and then may send it to the FPGA 218 and the CPU 220 (collectively may function as the controller 108) for further processing.

The FPGA 218 may be a programmable integrated circuit that allows for the customization of the digital signal processing operations (or algorithms) used in the repeater core 208. The FPGA 218 along with the CPU 220 (collectively referred to as the controller 108) may be used to control the operation of the various components in the repeater core 208 and for managing the flow of signals through the repeater system 102.

Each PAMiD component 222A and 222B may include the PA 228 that may amplify the signal power while the duplexer comprising of filters, Tx-Rx switches, and coupler allows for the simultaneous transmission and reception of the signal. The flow of signals through the repeater core 208 may involve the captured RF signal from at least one of the plurality of different configurations of the plurality of donor antennas 106 at the donor side 224A being received and filtered by various components in the PAMiD component 222A. In the PAMiD component 222A, the signal after filtering may pass to the LNA 238 that may amplify the signal without adding additional noise before the signal is sent to the AFE 216 for processing. The signal may then be digitized by the AFE 216 (e.g., using an analogue to digital converter), processed by the controller 108 (e.g., a digital signal processor, such as the FPGA 218 along with the CPU 220), passed back to the AFE 216 and transmitted back out through the PAMiD component 222B (with signal amplification and filtering or without amplification in some case) to the plurality of service antennas 112 at the service side 224B.

The Tx-Rx SW 230 may be used to switch between transmitting and receiving modes and may be used in conjunction with the PA 228. The BPF 232 may be configured to filter out unwanted signals that are outside of the frequency range of interest, for example, outside C-band, to reduce noise and interference. The HPF 234 may be configured to filter out low-frequency signal to prevent low-frequency noise and interference from being amplified. The CPL component 236 may be used to couple the signal from the BPF 232 to the AFE 216 so that the filtered and amplified signal may be properly sent to the AFE 216. The LNA 238 may amplify the signal without adding additional noise before the signal is sent to the AFE 216 for processing.

In operation, the controller 108 of the first repeater device 102A may set the identified first configuration of donor antennas at the first repeater device 102A to capture radio frequency (RF) signals from the first RAN node 202 in the first frequency band (e.g., n77 or n78 and b42 (or B48 or B43) frequency band to anchor LTE signal for non-standalone (NSA) 5G NR, or other frequency band like FR1 or FR2 5G NR). The captured RF signal may manifest improved SNR due to the selection of the identified first configuration of donor antennas, as discussed in detail, for example, in FIG. 2A. The captured RF signal from the donor side 224A may be fed to the PAMiD 22A. In the receive mode, the PA 228 may be bypassed, and the signal from the first configuration of the donor antennas may be filtered by the BPF 232 and the HPF 234. The filtered signal may be amplified by the LNA 238 and then may be passed to the AFE 216. This allows the repeater core 208 to receive captured RF signals with significantly improved SNR and data throughput rate via the first configuration of donor antennas while minimizing noise and interference from the captured RF signal. The captured RF signal may then be digitized by the AFE 216 (e.g., using an analogue to digital converter). The AFE 216 may be configured to digitize the captured RF signal and process it using the digital signal processing algorithms programmed into the FPGA 218.

In accordance with an embodiment, the controller 108 (e.g., a digital signal processor) may be further configured to perform various digital signal processing functions, such as digital filtering, master information block (MIB) decoding, gain control, oscillation detection and mitigation, channel equalization, and adding test signal to calibrate donor and relay, and in some cases beam search and beam refinement functions. For example, for the digital filtering, noise and interference may be removed from signal using digital filters, allowing the desired signal to be amplified without distortion. The MIB may contain information about the physical layer characteristics of the network, such as the modulation scheme and coding rate used by the first RAN node 202 (e.g., a gNB). By decoding this information, the controller 108 may optimize the repeater's physical layer performance, leading to improved SNR and overall network performance. For the gain control, the controller 108 may be configured to adjust the gain of the captured signal by adjusting the amplification of the signal to optimize its performance in terms of improved SNR and reduce the risk of distortion or saturation. For oscillation detection and mitigation, the controller 108 may be configured to prevent interference and improve the overall performance of the network. Oscillation is a type of interference that may occur in a wireless network when the signal is amplified too much, causing it to feed back into the system and create a loop. By channel equalization, distortion and interference may be corrected, if any and the risk of errors or loss of packets, may be reduced. Further, by addition of the test signal, the donor and relay signals may be calibrated to ensure that the signals are properly aligned and optimized for maximum performance. In some cases, beam search and beam refinement may be bypassed when the first repeater device 102A is a mesh node. In such a case, the initial access information may be received from the central cloud server 120.

In accordance with an embodiment, after the digital processing of the captured RF signals, the processed signal may then be sent to the second PAMiD, i.e., the PAMiD component 222B, which amplifies it further to the required level using the PA 228 before passing it through the Tx-Rx SW 230 to the BPF 232. In other words, in the PAMiD component 222B, in the transmit mode, the PA 228 may amplify the signal from the AFE 216 and may send it to the plurality of service antennas 112 through the BPF 232 and the CPL component 236. The plurality of service antennas 112 may be further configured to relay the RF signals captured via the first configuration of donor antennas in the second frequency band at the second beam pattern to one or more UEs, such as the first UE 204 and the second UE 206. As the captured RF signals manifest increased SNR and data throughout rate, the relayed RF signals thus improves the QoE of the one or more UEs, such as the first UE 204 and the second UE 206. Beneficially, the first repeater device 102A significantly improves the data throughput rate and SNR of the one or more UEs 114 connected to the first repeater device 102A.

Beneficially, in some implementations, the repeater core 208 may further include PMU component 226, which may be used to monitor and measure the performance of the various components in the repeater core 208. For example, the controller 108 may be configured to utilise the PMU component 226 to measure the phasor of the RF signal at multiple points in the signal chain, providing information about the signal quality and integrity. By monitoring the phasors of the RF signal (e.g., the amplitudes and phases of the current and voltage waveforms associated with RF signals), the PMU may be configured to detect an oscillation, interference, or distortion in the signal. The PMU component 226 may be used in addition to the radio modem 110 for the feedback purpose. The PMU component 226 may be used analyze the signal path and identify areas of the signal chain where improvements can be made to optimize the performance of the first repeater device 102A. The feedback from the PMU component 226 may be used to adjust the amplification, filtering, and digital signal processing parameters in the first repeater device 102A to improve the signal quality and reduce interference.

Figure 3A:
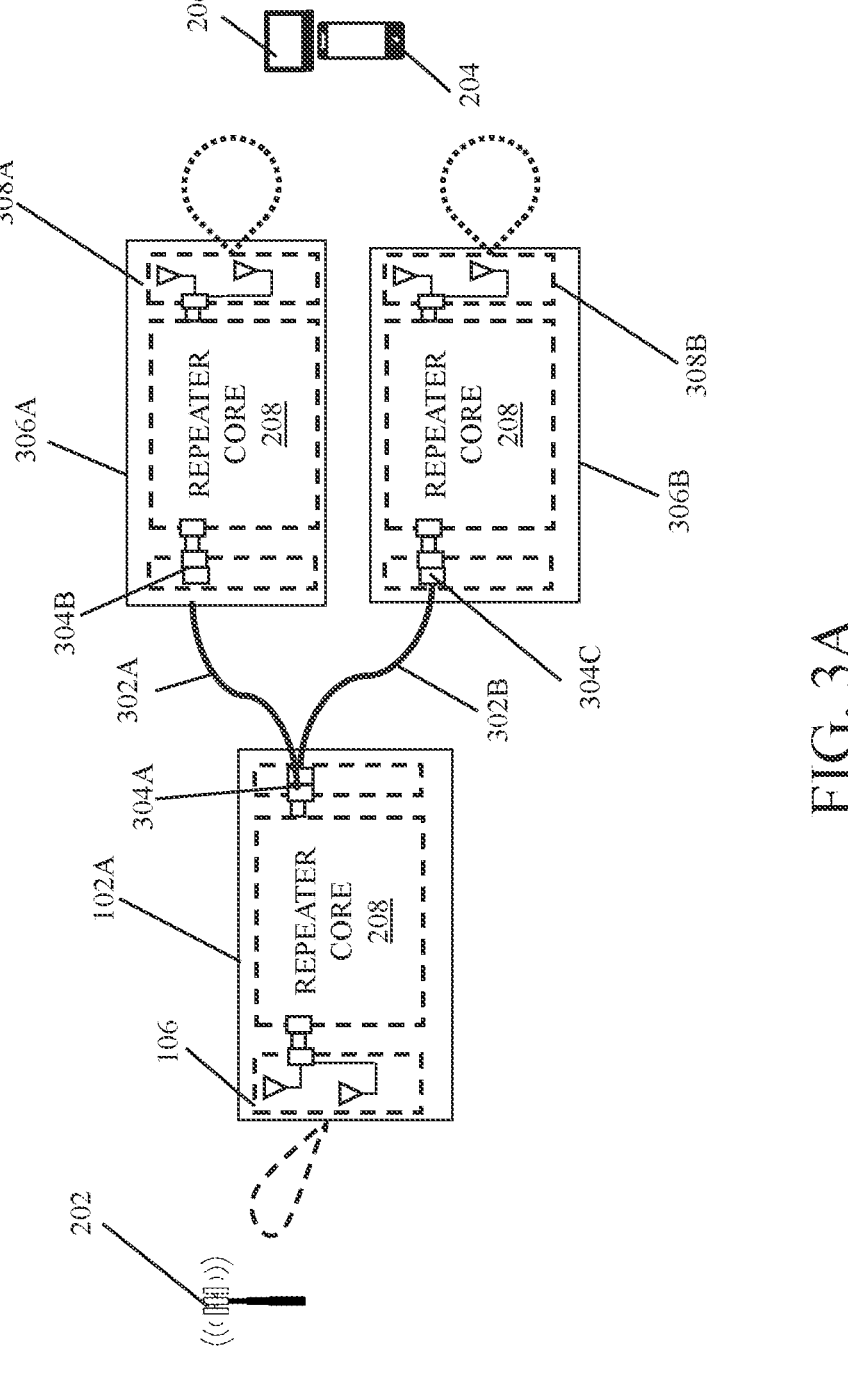
FIG. 3A is a diagram illustrating an exemplary repeater system with a first repeater device and relay devices, in accordance with an exemplary embodiment of the disclosure.

FIG. 3A is a diagram illustrating an exemplary repeater system with a first repeater device and relay devices, in accordance with an exemplary embodiment of the disclosure. FIG. 3A is explained in conjunction with elements from FIGS. 1, 2A, and 2B. With reference to FIG. 3A, there is shown a multi-box implementation of the repeater system 102 of FIG. 1, in which two relay devices (such as a first relay device 306A and a second relay device 306B) are coupled with the donor, such as the first repeater device 102A, via wired mediums 302A and 302B. In other words, in this embodiment, the repeater system 102 may comprise one or more relay devices, such as two relay devices (such as the first relay device 306A and the second relay device 306B) in addition to the first repeater device 102A, where the one or more relay devices may be connected to the first repeater device 102A via a corresponding wired connection medium 302A or 302B. Each of the two relay devices may be installed indoors at a different location.

In this implementation, the first repeater device 102A may not include the plurality of service antennas 112, and instead may include one or more connectors 304A (e.g., a SMA (SubMiniature version A) connector) to connect the wired medium 302A and 302B (e.g., a coaxial cable or a fiber optic cable) to the two relay devices (such as the first relay device 306A and the second relay device 306B) through the two connectors 304B and 304C (e.g., SMA connectors). Each of the devices of the repeater system 102 in the multi-box implementation may be mesh network capable and supports indoor and outdoor enterprise use case to increase coverage in different nooks and corners of a given building or enterprise. The operations of the repeater core 208 may be the same as that described, for example, in FIG. 2B in each of the two relay devices (such as the first relay device 306A and the second relay device 306B). In this case, the plurality of service antennas 308A and 308B of each of the two relay devices (such as the first relay device 306A and the second relay device 306B) may be configured to relay the captured RF signals to the one or more UEs, such as the first UE 204 and the second UE 206.

Figure 3B:
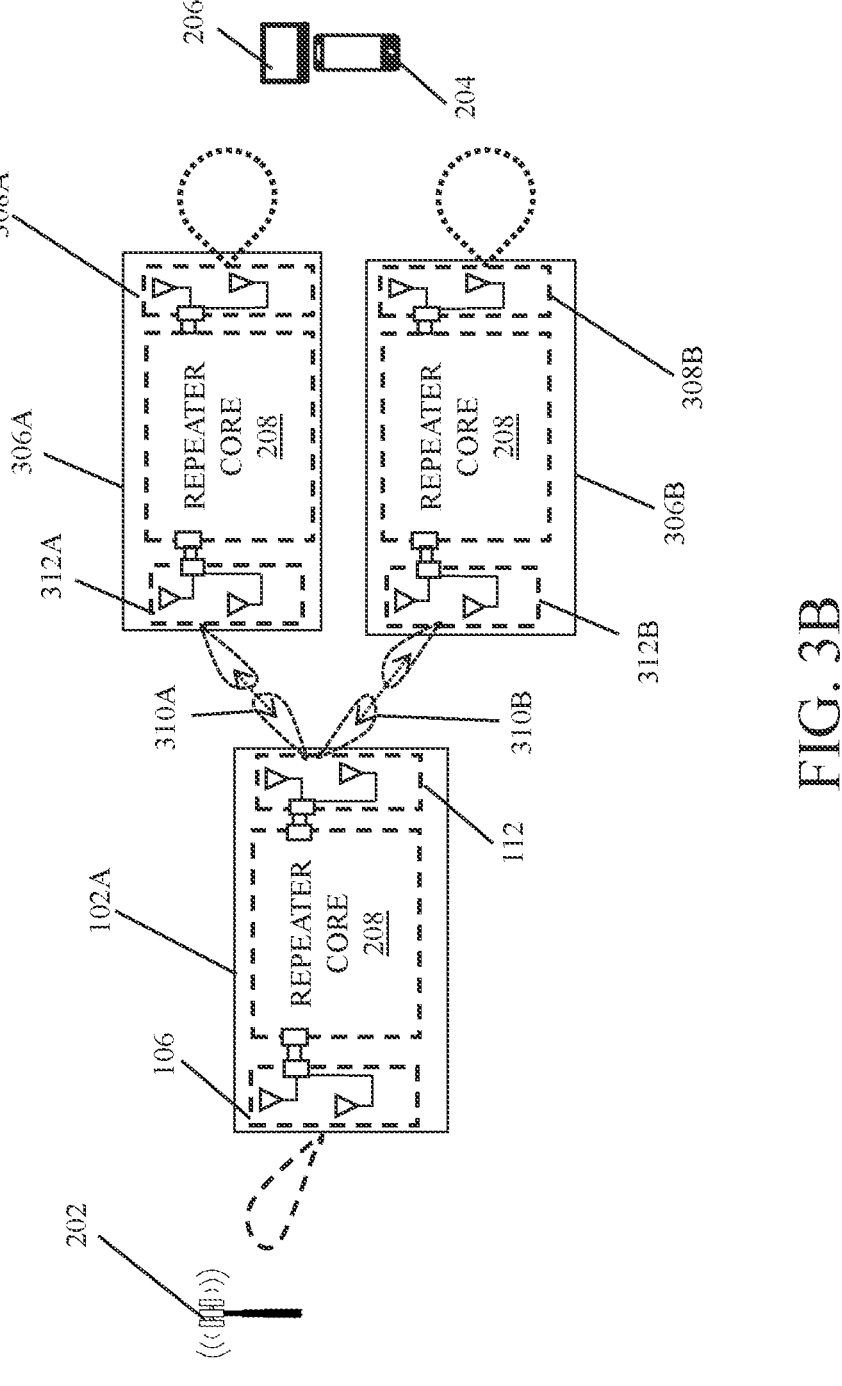
FIG. 3B is a diagram illustrating an exemplary repeater system with a first repeater device and relay devices, in accordance with another exemplary embodiment of the disclosure.

FIG. 3B is a diagram illustrating an exemplary repeater system with a first repeater device and relay devices, in accordance with another exemplary embodiment of the disclosure. FIG. 3B is explained in conjunction with elements from FIGS. 1, 2A, 2B, and 3A. With reference to FIG. 3B, there is shown another multi-box implementation of the repeater system 102 of FIG. 1, in which two relay devices (such as the first relay device 306A and the second relay device 306B) are coupled with the donor, such as the first repeater device 102A, via wireless mediums 310A and 310B. In other words, in this embodiment, the repeater system 102 may comprise one or more relay devices, such as two relay devices (such as the first relay device 306A and the second relay device 306B) in addition to the first repeater device 102A, where the one or more relay devices may be connected to the first repeater device 102A via a wireless connection medium 310A or 310B in a dedicated frequency band different from the first frequency band and the second frequency band. In an implementation, the dedicated frequency band may be an Industrial Scientific Medical Band (ISM) radio frequency band, which may be an unlicensed band. In another implementation, the dedicated frequency band may be the frequency range 2 (FR2) band of 5G NR, for example, between 24.25 GHz to 71.0 GHz.

In this implementation, the first repeater device 102A may include the plurality of service antennas 112, which may be used to wirelessly connect to the two relay devices (such as the first relay device 306A and the second relay device 306B) concurrently via two beams of RF signals (i.e., the wireless mediums 310A and 310B) in the ISM band or the FR2 band. The operations of the repeater core 208 may be the same as that described, for example, in FIG. 2B in each of the two relay devices (such as the first relay device 306A and the second relay device 306B). In this case, each of the two relay devices (such as the first relay device 306A and the second relay device 306B) may further include a plurality of donor antennas 312A or 312B, which may be used to communicate with the plurality of service antennas 112 of the first repeater device 102A via the dedicated frequency band, such as the ISM band or the FR2 band. However, the plurality of service antennas 308A and 308B of each of the two relay devices (such as the first relay device 306A and the second relay device 306B) may be configured to relay the captured RF signals to the one or more UEs, such as the first UE 204 and the second UE 206 in a different frequency band, for example, C-band, in a broad beam pattern.

Figure 4A:
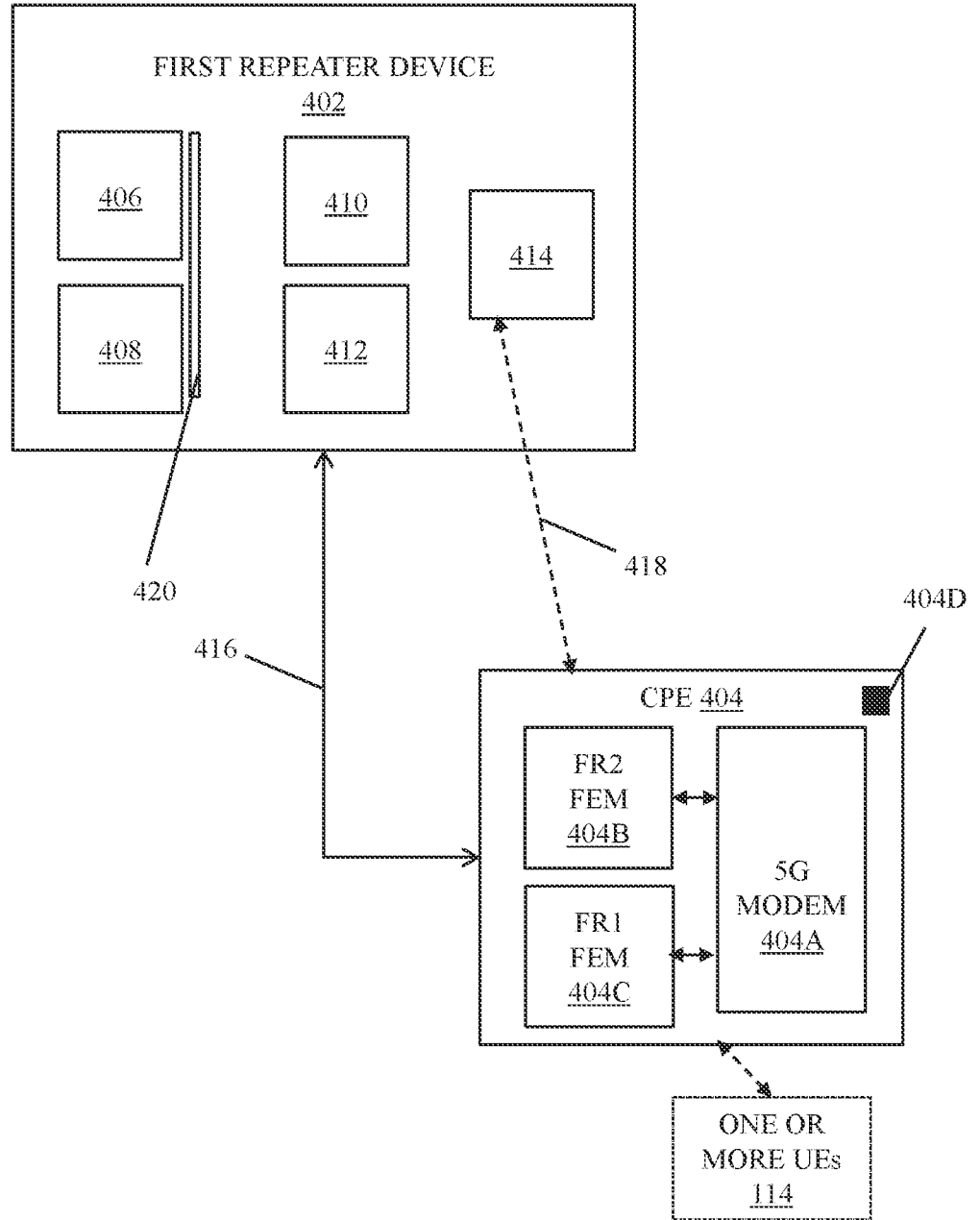
FIG. 4A is a diagram illustrating an exemplary repeater system implemented as a remote antenna device, in accordance with yet another exemplary embodiment of the disclosure.

FIG. 4A is a diagram illustrating an exemplary repeater system implemented as a remote antenna device, in accordance with another exemplary embodiment of the disclosure. FIG. 4A is explained in conjunction with elements from FIGS. 1, 2A, 2B, 3A, and 3B. With reference to FIG. 4A, there is shown a first repeater device 402 implemented as a remote antenna device and a fixed wireless access (FWA) device 404, such as a 5G-enabled customer premise equipment (CPE) or a 5G-enabled integrated access and backhaul (IAB) device, which may be communicatively coupled with the first repeater device 402 over an out-of-band control link, such as a personal area network (PAN) like a Bluetooth™ low energy (BLE) link.

In operation, the first repeater device 402 that may be implemented as remote antenna device may be communicatively coupled to the FWA device 404 via a wired or wireless medium (e.g., ISM, FR2, or other mmWave frequency medium). In an implementation, the one or more inbuilt antennas 404D (i.e., internal antennas) of the FWA device 404 may be bypassed when the first repeater device 402 is communicatively coupled to the FWA device 404. The first repeater device 402 may be configured to establish an out-of-band control link 416 (e.g., a Bluetooth Low Energy (BLE) link or other personal area network link) with the FWA device 404. The FWA device 404 may be configured to communicate control instruction to the first repeater device 402 over the out-of-band control link 416. Alternatively stated, the first repeater device 402 may be communicatively coupled to the FWA device 404, and where the one or more inbuilt antennas 404D of the FWA device 404 may be bypassed and deactivated when the first repeater device 402 is communicatively coupled to the FWA device 404 to enable capture of the RF signals from the first RAN node 202 by the first configuration of donor antennas at the first repeater device 402. The first repeater device 402 may be configured to sense a location of the FWA device 404 by communicating a programmable service beam 418 capable of sensing the location of the FWA device 404. The first repeater device 402 (implemented as the remote antenna device) may include a plurality of donor antennas 406 and 408, which may be multi-band antennas that may operate in C-band as well as other mmWave band alternatively or concurrently. The first repeater device 402 may further include one or more mmWave-enabled RF chipsets 410 and 412 and one or more service antennas 414 that may relay the captured RF signals to the FWA device 404. In an implementation, the FWA device 404 may include one or more front end module (FEM) components, such as an FR1 FEM component 404B and a FR2 FEM component 404C, and a 5G modem 404A. In another implementation, one multiband FEM component may be provided that may operate in both FR1 and FR2 band of 5G NR, for example, for wireless local area network (WLAN). The 5G modem 404A may correspond to the radio modem 110 of FIG. 1, in an example.

In the conventional systems, many UEs, such as the one or more UEs 114 that are located beyond the communication range of the first RAN node 202 or the UEs that suffer from inconsistent signal strength issues being in cell edge areas, either require additional infrastructure, such as dense deployment of small cells and conventional repeater devices to fill the coverage gaps in the cellular communication to enable multi-gigabit data communication or a wired broadband connection. However, such deployments increase the infrastructure cost (e.g., cost of deployment as well as maintenance), and still often the signal strength and data throughput vary throughout a day (i.e., signal fluctuations or data throughput rate fluctuations observed throughout a given 24-hours cycle in a day). It is observed during experimentation that the fluctuations or changes in signal quality at different times-of-day may be attributed to dynamic nature of the environment, e.g., any change in surroundings that has the potential to adversely impact signal propagation, cause signal loss, poor reach, or signal blockage by moving or stationary objects in surroundings. Further, a fluctuation (e.g., an increase or decrease) in the base station transmitting power at different times of day or a change in weather may further lead to fluctuations or changes in signal quality at different times of day. Furthermore, in certain scenarios, radiated RF beams from the first RAN node 202 in different directions using the beam sweeping mechanism may be obstructed by one or more signal obstructing objects in a specific geographical area, for example, in and around a building. It is also observed that a change in radiation pattern of the first RAN node 202 and a presence of reflective objects in the signal reception path may also contribute to the inconsistency of signal reception at a given location around a building. Currently, thus wired broadband connection is still preferred over fixed wireless access (FWA) systems and solutions, like a conventional CPE as conventional FWA systems are unable to provide the data speeds needed to compete with wired broadband connections.

In contrast to the conventional FWA systems, the first repeater device 402 implemented as the remote antenna device of the present disclosure enables to improve signal quality and data throughput of the UEs, such as the one or more UEs 114, by significantly improving the performance of the FWA device 404 to which the one or more UEs 114 may be connected. Instead of using the one or more inbuilt antennas 404D of the FWA device 404, the first repeater device 402 implemented as the remote antenna device employs intelligent identification and setting of the best configuration of donor antennas of the plurality of donor antennas 406 and 408 to improve quality of RF signals captured from the first RAN node 202 (e.g., an existing base station or an existing small cell). In an implementation, a different configuration of donor antennas may be set at different time-of-day, which is observed to significantly improve the data throughput rate and improve signal receptivity (i.e., signal strength of captured RF signals) in the 5G NR communication by manyfold (such as more than 5 times) as compared to conventional CPE or conventional FWA systems.

In accordance with an embodiment, the first repeater device 402 may be configured to concurrently capture: (a) a first set of RF signals, by a first set of donor antennas of the plurality of donor antennas 406 and 408, from the first base station 116A associated with the first WCN 118A via a first set of channels, and (b) a second set of RF signals, by a second set of donor antennas of the plurality of donor antennas 406 and 408, from the second base station 116B associated with the second WCN 118B via a second set of channels.

In accordance with an embodiment, like the signal quality value (e.g., SNR) determined for the first configuration of donor antennas, signal quality values (e.g., signal strength in decibels and data throughput rate) may be acquired for different configuration of donor antennas at different times of day for the location of the first repeater device 402. Such measured values of signal quality values for different configuration of donor antennas at different times of day, may be communicated to the FWA device 404 over the out-of-band control link 416 or to the central cloud server 120. The FWA device 404 or the central cloud server 120 may be configured to instruct the first repeater device 402, which configuration of donor antennas to select at a given time-of-day such that a radio frequency (RF) signal receptivity in terms of SNR and data throughput is increased. A different instruction that includes another configuration of donor antennas may be communicated by the FWA device 404 at another time of day. In other words, the instruction received from the FWA device 404 comprises learned information that is different at different time-of-day to meet the two objectives of optimizing signal reception from the first RAN node 202 and maximizing the SNR.

In an implementation, the plurality of donor antennas 406 and 408 may be distributed on the same plane on a planar substrate 420. The planar substrate 420 may be a type of fiberglass material commonly used in printed circuit boards (PCBs), such as FR4 or other materials such as ceramic, polyimide, and Roger's substrate.

In this implementation, the first repeater device 402 may be used to provide outdoor-to-indoor coverage. In an example, the first repeater device 402 may support the following: high modulation (e.g., 256QAM<2% EVM), 200 MHz Bandwidth (Adjacent Channel Leakage Ratio (ACLR)

>45 dB), Master Information Block (MIB) decoding, low latency digital channel filter <500 ns, potential frequency response equalization, gain control, real time downlink (DL)-uplink (UL) isolation (Oscillation) monitoring, saturation detection control for ADC, further support horizontal cum vertical polarization, MIMO, and may operate in a frequency band, such as n77 band: 3.2-4.2 GHz.

In accordance with an embodiment, the central cloud server 120 may be further configured to cause the FWA device 404 and the first repeater device 402 to perform a discovery operation. The discovery operation may comprise identifying and setting the correct configuration of donor antennas for the first repeater device 402 that improves the signal state (higher signal strength and higher data throughput rate) as compared to a signal state on use of the one or more inbuilt antennas 404D by the FWA device 404.

Figure 4B:
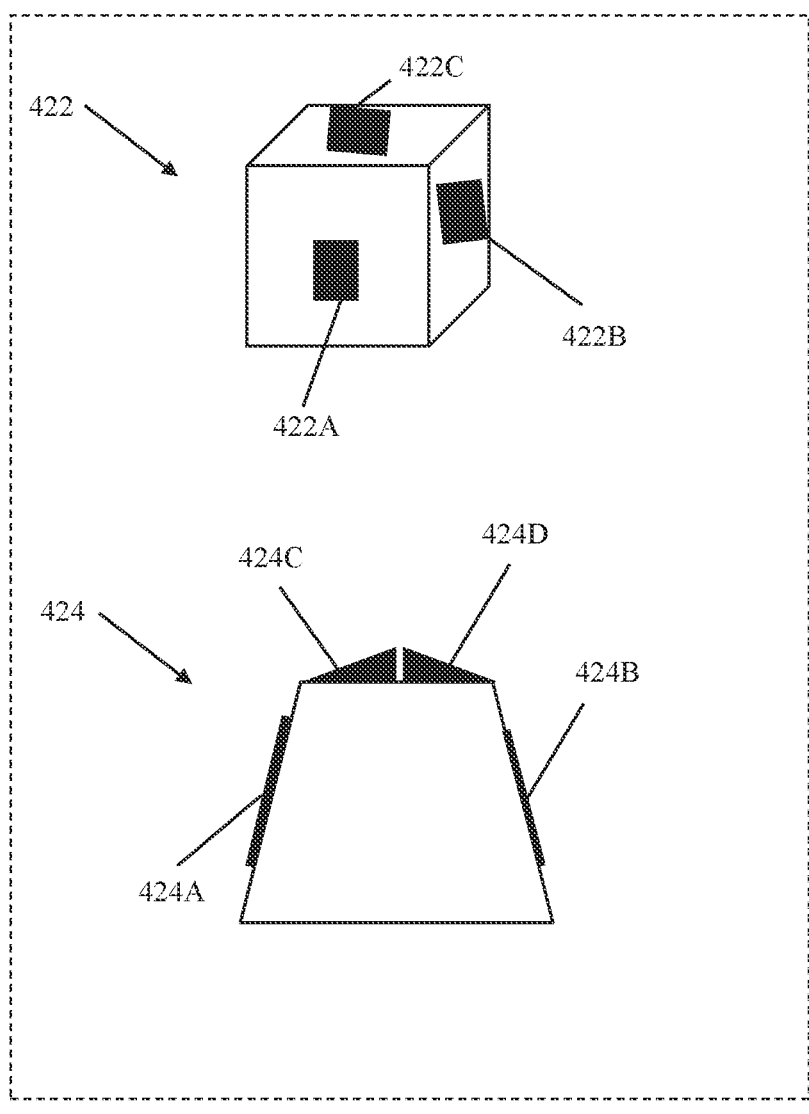
FIG. 4B is a diagram illustrating an exemplary polygonal antenna structure of a repeater system, in accordance with another exemplary embodiment of the disclosure.

FIG. 4B is a diagram illustrating an exemplary polygonal antenna structure of a repeater system, in accordance with another exemplary embodiment of the disclosure. FIG. 4B is explained in conjunction with elements from FIGS. 1, 2A, 2B, 3A, 3B, and 4A. With reference to FIG. 4B, there is shown a first polygonal antenna structure 422 and a second polygonal antenna structure 424. In an example, the first polygonal antenna structure 422 may be a cube-shaped structure, where one or more donor antennas 422A, 422B, or 422C of the plurality of donor antennas, may be distributed on different planes of the first polygonal antenna structure 422. Similarly, the second polygonal antenna structure 424 may be a trapezoid structure, where one or more donor antennas 424A, 424B, 424C, or 424D of the plurality of donor antennas may be distributed on different planes of the second polygonal antenna structure 424. Deepening on a given time of day, which of the one or more donor antennas of the plurality of donor antennas at which plane of the different planes of the first polygonal antenna structure 422, manifest highest SNR, such one or more donor antennas may be selected for the signal reception by the first repeater device 102A and other donor antennas may be temporarily deactivated.

FIG. 5 is a method that illustrates an exemplary method for operating a repeater system for high performance wireless communication, in accordance with an embodiment of the disclosure. FIG. 5 is explained in conjunction with elements from FIGS. 1, 2A, 2B, 3A, 3B, 4A, and 4B. With reference to FIG. 5, there is shown a flowchart 500 comprising exemplary operations 502 to 512. The operations 502 to 512 may be implemented in the repeater system 102.

At 502, a plurality of different configurations of the plurality of donor antennas 106 may be set up in the first repeater device 102A of the repeater system 102. The controller 108 of the first repeater device 102A may be configured to set up the plurality of different configurations of the plurality of donor antennas 106.

At 504, RF signals for each of the plurality of different configurations of the plurality of donor antennas 106 may be scanned. The controller 108 may be further configured to scan the captured RF signals for each of the plurality of different configurations of the plurality of donor antennas 106 to check corresponding SNR value for each configuration of donor antennas.

At 506, feedback from the radio modem 110 may be acquired for each of the plurality of different configurations of the plurality of donor antennas 106. The controller 108 of the first repeater device 102A may be further configured to acquire the feedback, for example, in terms of SNR and data throughput rate, for each of the plurality of different configurations of the plurality of donor antennas 106.

At 508, a first configuration of donor antennas that manifests a highest SNR from amongst the plurality of different configurations may be identified. The controller 108 of the first repeater device 102A may be further configured to identify the first configuration of donor antennas, such as the best configuration that manifests the highest SNR and data throughput rate from amongst the plurality of different configurations.

In an implementation, in order to identity the first configuration of donor antennas (i.e., the best configuration) in terms of highest SNR and data throughout rate, the operation 508 may include sub-operations, such as the operations 508A and 508B. At 508A, a number of independent channels towards the first base station 116A (e.g., the first RAN node 202) and a corresponding SNR of each independent channel in the first frequency band (e.g., a C-frequency band) may be found. The controller 108 may be further configured to find the number of independent channels towards the first base station 116A (e.g., the first RAN node 202) and a corresponding SNR of each independent channel. At 508B, it may be determined that RF signals from which independent channels to combine to increase gain based on the finding of the number of independent channels and the corresponding SNR of each independent channel. The controller 108 may be further configured to determine that RF signals from which independent channels to combine to increase gain.

At 510, the identified first configuration of donor antennas may be set at the first repeater device 102A to capture radio frequency (RF) signals from the first RAN node 202 in a first frequency band (e.g., a C-band) at a first beam pattern (e.g., a narrow beam pattern). The controller 108 of the first repeater device 102A may be further configured to set the identified first configuration of donor antennas at the first repeater device 102A.

At 512, the RF signals captured via the first configuration of donor antennas may be relayed in a second frequency band at a second beam pattern to one or more UEs 114 (e.g., the first UE 204 and the second UE 206). The plurality of service antennas 112 may be further configured to relay the RF signals captured via the first configuration of donor antennas to the one or more UEs 114.

Various embodiments of the disclosure may provide a non-transitory computer-readable medium having stored thereon computer implemented instructions that when executed by a computer causes a communication system (e.g., the repeater system 102) to execute operations, the operations comprising setting up the plurality of different configurations of the plurality of donor antennas 106 in the first repeater device 102A of the repeater system 102. The operations further comprising acquiring a feedback from the radio modem 110 of the repeater system 102 for each of the plurality of different configurations of the plurality of donor antennas 106, identifying a first configuration of donor antennas that manifests a highest signal-to-noise ratio (SNR) from amongst the plurality of different configurations, and setting the identified first configuration of donor antennas at the first repeater device 102A to capture radio frequency (RF) signals from the first RAN node 202 in a first frequency band at a first beam pattern. The operations further comprise relaying, by the plurality of service antennas 112 of the repeater system 102, the RF signals captured via the first configuration of donor antennas in a second frequency band at a second beam pattern to one or more UEs 114, such as the first UE 204 and the second UE 206.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object, or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A repeater system, comprising:
a first repeater device comprising a plurality of donor antennas, a radio modem, and a controller,
wherein the controller is configured to:
set up, via a switching network, a plurality of different configurations that electrically connect a different number of donor antennas of the plurality of donor antennas;
acquire feedback from the radio modem for each of the plurality of different configurations of the plurality of donor antennas;
identify a first configuration of the plurality of donor antennas that manifests a highest signal-to-noise ratio (SNR) from amongst the plurality of different configurations; and
set the identified first configuration of the plurality of donor antennas at the first repeater device to capture radio frequency (RF) signals from a first radio access network (RAN) node in a first frequency band at a first beam pattern; and
a plurality of service antennas configured to relay the RF signals captured via the first configuration of the plurality of donor antennas in a second frequency band at a second beam pattern to one or more user equipment (UEs).

2. The repeater system according to claim 1, wherein
the different number of donor antennas of the plurality of donor antennas are electrically connected in a different shape pattern via the switching network, and
the different shape pattern includes one of a U-shaped pattern, a C-shaped pattern, an L-shaped pattern, a 2×3 grid, a circular pattern, or a linear pattern.

3. The repeater system according to claim 1, wherein the first frequency band is same as the second frequency band.

4. The repeater system according to claim 1, wherein the first frequency band is different from the second frequency band.

5. The repeater system according to claim 1, wherein the first beam pattern has a beam width that is less than the beam width of the second beam pattern.

6. The repeater system according to claim 1, further comprising one or more relay devices in addition to the first repeater device, wherein the one or more relay devices are connected to the first repeater device via a corresponding wired connection medium or a wireless connection medium in a dedicated frequency band different from the first frequency band and the second frequency band.

7. The repeater system according to claim 1, wherein the plurality of donor antennas are distributed on a same plane on a planar substrate.

8. The repeater system according to claim 1, wherein the plurality of donor antennas are distributed on different planes in form of a polygonal antenna structure, in which each side of the polygonal antenna structure comprises one or more donor antennas of the plurality of donor antennas.

9. The repeater system according to claim 1, wherein the first repeater device is communicatively coupled to a customer premise equipment (CPE), and wherein one or more inbuilt antennas of the CPE are bypassed when the first repeater device is communicatively coupled to the CPE to enable capture of the RF signals from the first RAN node by the first configuration of donor antennas at the first repeater device.

10. The repeater system according to claim 1, wherein the feedback from the radio modem comprises a signal quality state, a throughput rate, and other signal parameters captured at a location of the first repeater device for each of the plurality of different configurations of the plurality of donor antennas.

11. The repeater system according to claim 1, wherein the first repeater device is communicatively coupled to a central cloud server, and wherein the feedback from the radio modem for each of the plurality of different configurations of the plurality of donor antennas is communicated to the central cloud server.

12. The repeater system according to claim 1, wherein the controller is further configured to scan RF signals for each of the plurality of different configurations of the plurality of donor antennas and the feedback is acquired when a scanned and captured RF signal is passed to the radio modem.

13. The repeater system according to claim 1, wherein the controller is further configured to switch from the first configuration of donor antennas to a second configuration of the plurality of donor antennas when the SNR associated with the first configuration of the plurality of donor antennas falls below a first threshold value but is above a second threshold value.

14. The repeater system according to claim 1, wherein the controller is further configured to switch from the first configuration of donor antennas to a second configuration of the plurality of donor antennas based on an instruction received from a central cloud server communicatively coupled to the first repeater device.

15. The repeater system according to claim 1, wherein the controller is further configured to switch from the first configuration of donor antennas to a second configuration of the plurality of donor antennas based on a given time-of-day to maintain a data throughput rate at the one or more UEs above a threshold data speed value.

16. The repeater system according to claim 1, wherein the controller is further configured to identify a number of independent channels towards a first base station and a corresponding SNR of each independent channel in the first frequency band, and wherein the first base station corresponds to the first RAN node.

17. The repeater system according to claim 16, wherein the controller is further configured to determine which independent channels of the number of independent channels to combine to increase gain based on the identification of the number of independent channels and the corresponding SNR of each independent channel of the number of independent channels.

18. The repeater system according to claim 1, wherein the controller is further configured to concurrently capture:

a first set of RF signals, by a first set of donor antennas of the plurality of donor antennas, from a first base station associated with a first wireless carrier network via a first set of channels, and a second set of RF signals, by a second set of donor antennas of the plurality of donor antennas, from a second base station associated with a second wireless carrier network via a second set of channels.

19. A method of operating a repeater system, the method comprising:

in the repeater system:

setting up, via a switching network, a plurality of different configurations that electrically connect a different number of donor antennas of a plurality of donor antennas in a first repeater device of the repeater system;

acquiring feedback from a radio modem of the repeater system for each of the plurality of different configurations of the plurality of donor antennas;

identifying a first configuration of the plurality of donor antennas that manifests a highest signal-to-noise ratio (SNR) from amongst the plurality of different configurations;

setting the identified first configuration of the plurality of donor antennas at the first repeater device to capture radio frequency (RF) signals from a first radio access network (RAN) node in a first frequency band at a first beam pattern; and relaying, by a plurality of service antennas of the repeater system, the RF signals captured via the first configuration of the plurality of donor antennas in a second frequency band at a second beam pattern to one or more user equipment (UEs).

* * * * *